(12) United States Patent
Potasek et al.

(10) Patent No.: US 11,692,895 B2
(45) Date of Patent: Jul. 4, 2023

(54) DIFFERENTIAL PRESSURE SENSOR

(71) Applicant: Rosemount Aerospace Inc., Burnsville, MN (US)

(72) Inventors: David P. Potasek, Lakeville, MN (US); Jun Zheng, Edina, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 115 days.

(21) Appl. No.: 17/217,234

(22) Filed: Mar. 30, 2021

(65) Prior Publication Data
US 2022/0316973 A1 Oct. 6, 2022

(51) Int. Cl.
*G01L 13/02* (2006.01)
*G01L 9/00* (2006.01)
*G01L 19/14* (2006.01)
*G01F 1/36* (2006.01)
*G01L 27/00* (2006.01)

(52) U.S. Cl.
CPC .............. *G01L 13/026* (2013.01); *G01F 1/36* (2013.01); *G01L 9/0048* (2013.01); *G01L 13/025* (2013.01); *G01L 19/142* (2013.01); *G01L 19/145* (2013.01); *G01L 27/005* (2013.01)

(58) Field of Classification Search
CPC ........ G01L 13/00; G01L 13/02; G01L 13/025
See application file for complete search history.

(56) References Cited

U.S. PATENT DOCUMENTS

| | | | |
|---|---|---|---|
| 4,165,402 A | 8/1979 | Dubs et al. | |
| 4,236,137 A | 11/1980 | Kurtz et al. | |
| 4,773,269 A * | 9/1988 | Knecht | G01L 19/0038 73/706 |
| 4,790,192 A * | 12/1988 | Knecht | G01L 19/148 73/754 |
| 4,800,758 A * | 1/1989 | Knecht | G01L 19/147 338/41 |
| 4,905,575 A * | 3/1990 | Knecht | F01B 19/00 73/718 |
| 5,056,369 A * | 10/1991 | Tamai | G01L 9/0073 73/718 |
| 5,209,118 A | 5/1993 | Jerman | |
| 5,295,395 A * | 3/1994 | Hocker | G01L 9/0073 92/103 SD |
| 5,515,732 A * | 5/1996 | Willcox | G01L 9/0042 73/756 |

(Continued)

FOREIGN PATENT DOCUMENTS

DE 102017103121 A1 * 9/2017 ............... G01L 1/16
WO WO-2015151731 A1 * 10/2015 ............. G01L 13/02

*Primary Examiner* — Herbert K Roberts
(74) *Attorney, Agent, or Firm* — Kinney & Lange, P.A.

(57) ABSTRACT

A differential MEMS pressure sensor includes a topping wafer with a top side and a bottom side, a diaphragm wafer having a top side connected to the bottom side of the topping wafer and a bottom side, and a backing wafer having a top side connected to the bottom side of the diaphragm wafer and a bottom side. The topping wafer includes a first cavity formed in the bottom side of the topping wafer. The diaphragm wafer includes a diaphragm, a second cavity formed in the bottom side of the diaphragm wafer underneath the diaphragm, an outer portion surrounding the diaphragm, and a trench formed in the top side of the diaphragm wafer and positioned in the outer portion surrounding the diaphragm.

17 Claims, 5 Drawing Sheets

(56) References Cited

U.S. PATENT DOCUMENTS

| | | | |
|---|---|---|---|
| 5,939,639 A | 8/1999 | Lethbridge | |
| 8,704,538 B2 * | 4/2014 | Grudzien | G01L 9/0072 |
| | | | 361/283.4 |
| 9,010,190 B2 * | 4/2015 | Potasek | B81B 7/0048 |
| | | | 73/715 |
| 9,267,858 B2 | 2/2016 | Tanaka et al. | |
| 9,783,411 B1 * | 10/2017 | Potasek | B81C 1/00269 |
| 9,963,341 B2 | 5/2018 | Potasek et al. | |
| 10,060,815 B2 * | 8/2018 | Kazama | G01L 19/04 |
| 10,260,976 B2 * | 4/2019 | Yoshikawa | B81B 3/0072 |
| 11,225,409 B2 * | 1/2022 | Yen | B81B 7/0029 |
| 2002/0014124 A1 | 2/2002 | Drewes et al. | |
| 2003/0162322 A1 * | 8/2003 | Chen | H01L 21/68728 |
| | | | 438/700 |
| 2005/0178208 A1 * | 8/2005 | Benzel | G01L 9/0055 |
| | | | 73/715 |
| 2005/0252300 A1 | 11/2005 | Miller | |
| 2006/0053893 A1 | 3/2006 | Banholzer et al. | |
| 2007/0113661 A1 | 5/2007 | Benzel et al. | |
| 2010/0308426 A1 * | 12/2010 | Getman | G01L 19/147 |
| | | | 257/419 |
| 2011/0146411 A1 * | 6/2011 | Doering | G01L 9/0054 |
| | | | 73/727 |
| 2013/0087865 A1 * | 4/2013 | Ten Have | B81C 99/0035 |
| | | | 257/419 |
| 2013/0192378 A1 * | 8/2013 | Chiou | G01L 9/0054 |
| | | | 73/721 |
| 2013/0193531 A1 * | 8/2013 | Nishikawa | H01L 29/84 |
| | | | 257/415 |
| 2014/0260645 A1 * | 9/2014 | Goodman | G01L 13/025 |
| | | | 73/717 |
| 2016/0109315 A1 * | 4/2016 | Nguyen | G01L 9/045 |
| | | | 73/708 |
| 2018/0209863 A1 * | 7/2018 | Golly | G01L 19/147 |

* cited by examiner

DIFFERENTIAL PRESSURE SENSOR

BACKGROUND

The present disclosure relates to pressure sensors, and in particular, to a differential pressure sensor.

A pressure sensor is configured to measure the pressure of a fluid. Pressure sensors can be absolute pressure sensors that measure a pressure of a first fluid compared to a reference pressure (typically a vacuum). Pressure sensors can also be differential pressure sensors that measure a difference in pressure between a first fluid and a second fluid. Pressure sensors can measure pressure in a variety of ways. For example, a pressure sensor can have a diaphragm that deforms based on the pressure of a first fluid and/or a second fluid and a piezoresistive strain gauge sensor on the diaphragm can measures the strain in the diaphragm caused by the deformation of the diaphragm.

Differential pressure sensors can have a first chamber on the first side of the diaphragm and a second chamber on the second side of the diaphragm. The first and second chambers are connected to first and second fluid sources, respectively. Stress from the connections between the fluid sources and mechanical support of the diaphragm and the package in which the differential pressure sensor is positioned can cause stress in the differential pressure sensor which can cause the diaphragm to erroneously deflect. Further, stress caused by line pressure can cause the diaphragm to erroneously deflect as well. Line pressure can be defined as the average of a first pressure of the first fluid and a second pressure of the second fluid. For example, when the first pressure and the second pressure are 100 psi, the differential pressure is 0 psi and the line pressure is 100 psi. The line pressure can also cause stress on the differential pressure sensor and cause the diaphragm to erroneously deflect.

When the diaphragm erroneously deflects, it can cause an erroneous output in the differential pressure sensor as the deflection of the diaphragm is not being caused by a pressure difference but rather by stress in the system. Traditionally, differential pressure sensors are made with thick topping and backing wafers to stiffen the pressure sensor and prevent stresses in the system for causing the diaphragm to erroneously deflect. However, this causes the differential pressure sensors to be larger in size and can limit the use of the differential pressure sensor.

SUMMARY

A differential MEMS pressure sensor includes a topping wafer with a top side and a bottom side, a diaphragm wafer having a top side connected to the bottom side of the topping wafer and a bottom side, and a backing wafer having a top side connected to the bottom side of the diaphragm wafer and a bottom side. The topping wafer includes a first cavity formed in the bottom side of the topping wafer. The diaphragm wafer includes a diaphragm, a second cavity formed in the bottom side of the diaphragm wafer underneath the diaphragm, an outer portion surrounding the diaphragm, and a trench formed in the top side of the diaphragm wafer and positioned in the outer portion surrounding the diaphragm.

A system includes a differential MEMS pressure sensor and a pedestal on which the differential MEMS pressure sensor is mounted. The differential MEMS pressure sensor includes a topping wafer with a top side and a bottom side, a diaphragm wafer having a top side connected to the bottom side of the topping wafer and a bottom side, a backing wafer having a top side connected to the bottom side of the diaphragm wafer and a bottom side, and a base wafer having a top side connected to the bottom side of the backing wafer and a bottom side. The topping wafer includes a first cavity formed in the bottom side of the topping wafer. The diaphragm wafer includes a diaphragm, a second cavity formed in the bottom side of the diaphragm wafer underneath the diaphragm, and an outer portion surrounding the diaphragm. The base wafer includes a third cavity formed in the top side of the base wafer, a groove formed in the bottom side of the base wafer, and a thin wall formed between the third cavity and the groove. The groove is configured to receive a portion of the pedestal.

DETAILED DESCRIPTION

A differential pressure sensor includes a topping wafer, a diaphragm wafer, a backing wafer, and a base wafer. The diaphragm wafer includes a diaphragm, and the differential pressure sensor has a first chamber on a top side of the diaphragm and a second chamber on a bottom side of the diaphragm. The diaphragm is configured to deflect in response to a difference in pressure between a first fluid in the first chamber and a second fluid in the second chamber. A trench is formed in the diaphragm wafer surrounding the diaphragm and is configured to prevent line pressure and packaging stress in the differential pressure sensor from causing the diaphragm to erroneously deflect. Further, the base wafer includes a groove that is configured to receive a portion of a pedestal on which the differential pressure sensor is mounted. The groove is shaped larger than the portion of the pedestal to absorb thermal stress between the differential pressure sensor and the pedestal. Further, a first cavity and a second cavity are formed in the base wafer to form a thin wall to absorb thermal stress between the differential pressure sensor and the pedestal.

Figure 1:
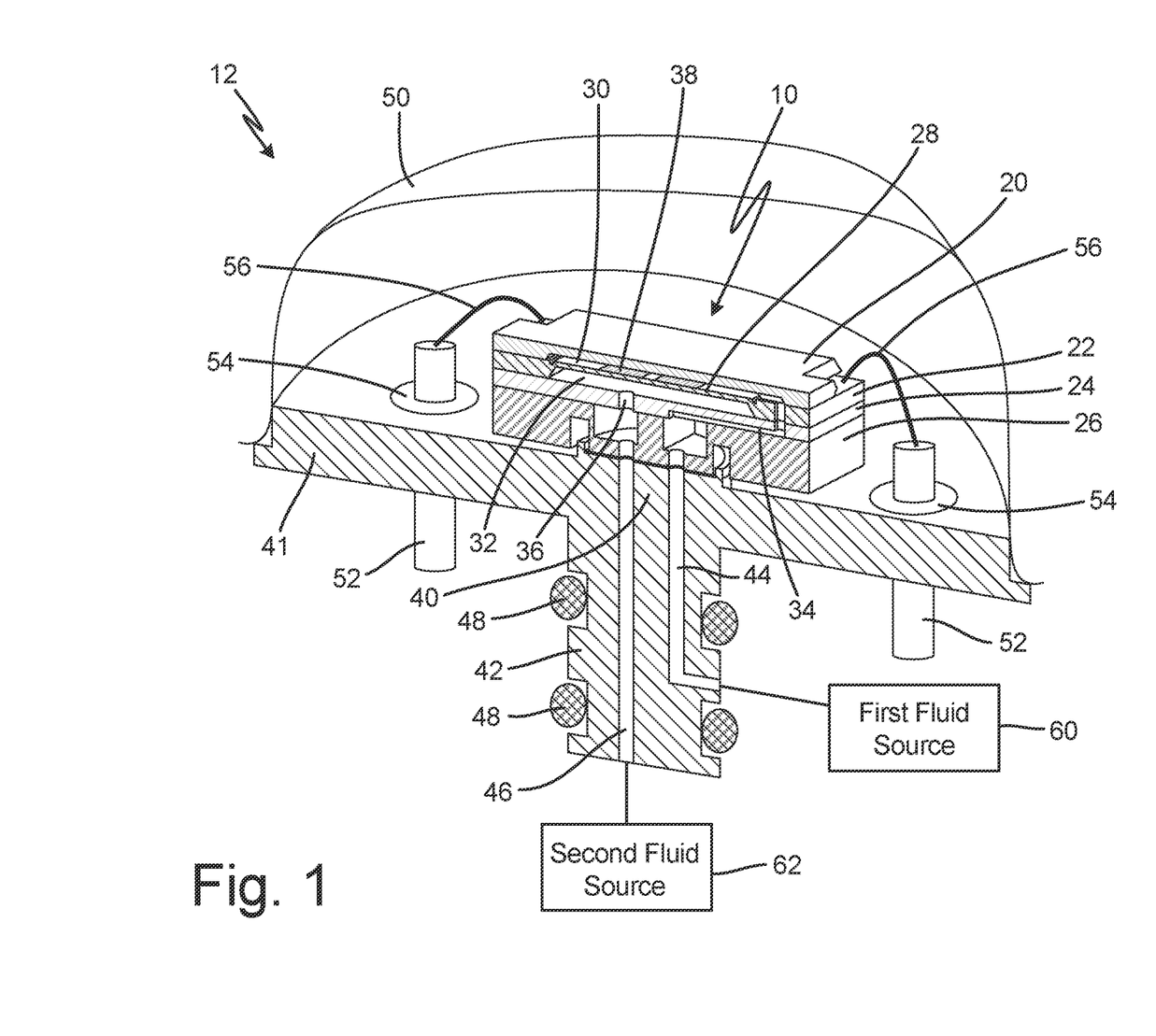
FIG. 1 is a cross-sectional perspective view of a differential pressure sensor in a sensor package.

FIG. 1 is a cross-sectional perspective view of differential pressure sensor 10 in sensor package 12. FIG. 1 shows differential pressure sensor 10 and sensor package 12. Differential pressure sensor 10 includes topping wafer 20, diaphragm wafer 22, backing wafer 24, base wafer 26, diaphragm 28, first chamber 30, second chamber 32, first channel 34, second channel 36, and piezoresistors 38. Sensor package 12 includes pedestal 40, header 41, pressure manifold 42, first passage 44, second passage 46, o-rings 48, cap 50, electrical pins 52, glass feedthrough 54, and wire bonds 56. FIG. 1 also shows first fluid source 60 and second fluid source 62.

Differential pressure sensor 10 is a micro-electro-mechanical system (MEMS) that is mounted in sensor package 12. Differential pressure sensor 10 is fabricated using MEMS processes (including deposition, patterning, lithography, and etching processes) and is formed of a wafer stack including topping wafer 20, diaphragm wafer 22, backing wafer 24, and base wafer 26. Topping wafer 20, diaphragm wafer 22, backing wafer 24, and base wafer 26 are all made out of silicon in the embodiment shown in FIG. 1, but can be made out of different materials in alternate embodiments, for example glass or quartz.

Differential pressure sensor 10 further includes diaphragm 28 that is part of diaphragm wafer 22. First chamber 30 is positioned above diaphragm 28, and second chamber 32 is positioned below diaphragm 28. First chamber 30 is configured to receive a fluid at a first pressure, and second chamber 32 is configured to receive a fluid at a second pressure. First chamber 30 is connected to first channel 34 that extends through topping wafer 20, diaphragm wafer 22, backing wafer 24, and base wafer 26. Second chamber 32 is connected to second channel 36 that extends through backing wafer 24 and base wafer 26. Piezoresistors 38 are positioned on diaphragm 28 and are configured to sense strain in diaphragm 28 caused by a deflection of diaphragm 28. In alternate embodiments, any sensor that is capable of sensing a deflection of diaphragm 28 can be used in place of piezoresistors 38, for example capacitive pickoff.

Differential pressure sensor 10 is mounted on pedestal 40 of sensor package 12. Pedestal 40 is attached to base wafer 26 of differential pressure sensor 10. Header 41 is positioned around pedestal 40 and extends under portions of differential pressure sensor 10. Pressure manifold 42 extends down from a center of pedestal 40. Header 41 and pressure manifold 42 are integrally formed with pedestal 40 in the embodiment shown in FIG. 1, but can be separate components in alternate embodiments. First passage 44 extends through pressure manifold 42 and pedestal 40 and is aligned with and in fluid communication with first channel 34 of differential pressure sensor 10. Second passage 46 extends through pressure manifold 42 and pedestal 40 and is aligned with and in fluid communication with second channel 36 of differential pressure sensor 10. Pressure manifold 42 also includes o-rings 48 to provide a seal between pressure manifold 42 and tubing (not shown in FIG. 1). In the embodiment shown in FIG. 1, pressure manifold 42 includes two o-rings 48, but pressure manifold 42 can include any number of o-rings 48 in alternate embodiments. In further alternate embodiments, tubing can be directly welded to pressure manifold 42 or tubing can be attached to a barbed fitting on pressure manifold 42.

Sensor package 12 further includes cap 50 that is positioned over pedestal 40, header 41, and differential pressure sensor 10. Cap 50 is sealed to an outer edge of header 41 to form an enclosure over differential pressure sensor 10. The enclosure formed between cap 50 and header 41 and pedestal 40 can include an inert gas, such as nitrogen and argon, in some embodiments. Sensor package 12 also includes electrical pins 52 extending through header 41. Glass feedthroughs 54 are positioned around electrical pins 52 and act as seals between electrical pins 52 and header 41. Wire bonds 56 extend between differential pressure sensor 10 and electrical pins 52. Wire bonds 56 connect to bond pads on differential pressure sensor 10 that are receiving a signal from piezoresistors 38 of differential pressure sensor 10 through wire traces on diaphragm wafer 22. Electrical pins 52 are configured to be connected to a circuit board or other suitable electronic device capable of receiving the signal from piezoresistors 38 on differential pressure sensor 10.

Differential pressure sensor 10 is configured to sense a difference in pressure between a first fluid and a second fluid. First fluid source 60 is in fluid communication with first passage 44 of sensor package 12 and first channel 34 of differential pressure sensor 10 to deliver a first fluid to first chamber 30 of differential pressure sensor 10. Second fluid source 62 is in fluid communication with second passage 46 of sensor package 12 and second channel 36 of differential pressure sensor 10 to deliver a second fluid to second chamber 32 of differential pressure sensor 10. Differential pressure sensor 10 is configured to sense a difference in pressure between a first pressure of the first fluid in first chamber 30 and a second pressure of the second fluid in second chamber 32. If the first pressure is different than the second pressure, diaphragm 28 will deflect up or down (depending on whether the first pressure or the second pressure is larger) and piezoresistors 38 will sense a signal representing the deflection of diaphragm 28 that can be used to determine the difference in pressure between the first fluid from first fluid source 60 and the second fluid from second fluid source 62.

Sensor package 12 and the connections between first fluid source 60 and second fluid source 62 can cause stress in differential pressure sensor 10. This stress can cause diaphragm 28 to erroneously deflect, causing faulty differential pressure readings in differential pressure sensor 10. Further, stress cause by line pressure can also cause diaphragm 28 to erroneously deflect and cause faulty differential pressure readings in differential pressure sensor 10. To prevent these stresses from erroneously deflecting diaphragm 28, a trench can be formed in diaphragm wafer 22 around a perimeter of diaphragm 28 to absorb the stresses. Further, a first cavity, a second cavity, and a thin wall are formed in base wafer 26 that also absorb the stresses. The trench, the first cavity, the second cavity, and the thin wall will be discussed in more details with respect to FIGS. 2-5B below.

Figure 2:
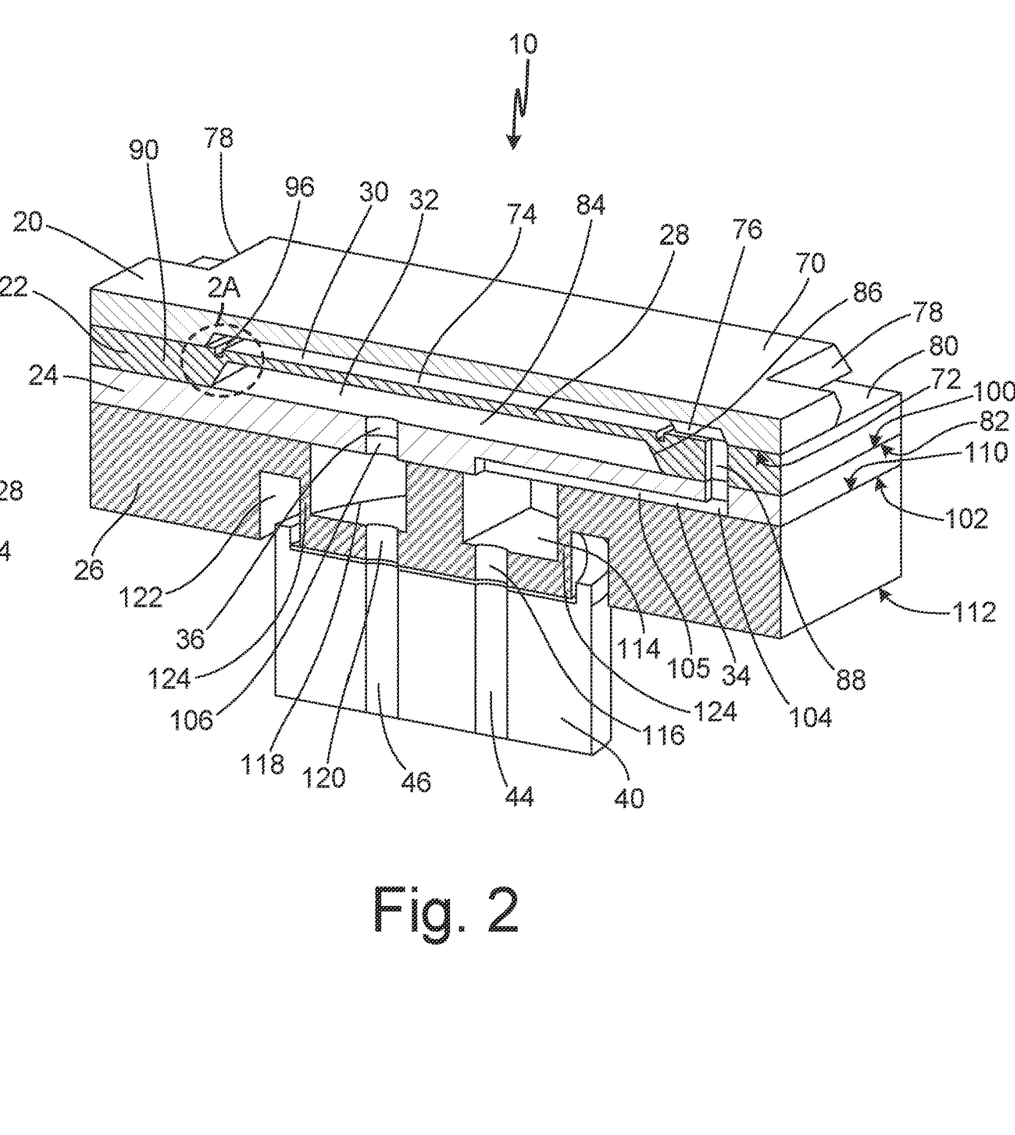
FIG. 2 is a cross-sectional perspective view of a differential pressure sensor.
Figure 2A:
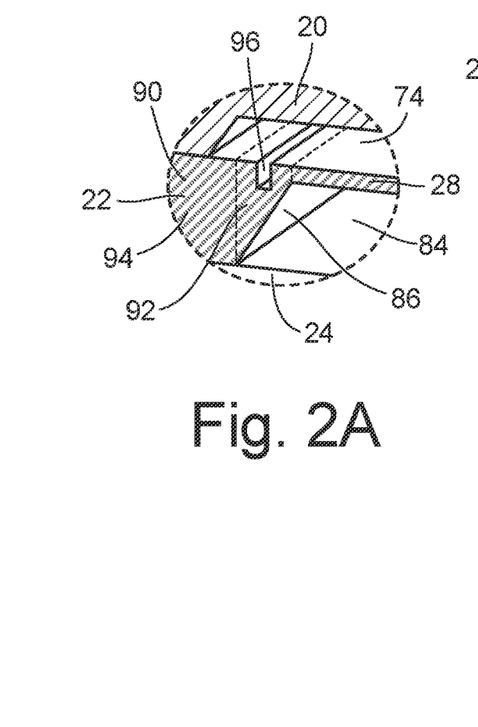
FIG. 2A is an enlarged view of a trench in a diaphragm wafer of the differential pressure sensor, identified by dashed circle 2A in FIG. 2.

FIG. 2 is a cross-sectional perspective view of differential pressure sensor 10. FIG. 2A is an enlarged view of trench 96 in diaphragm wafer 22 of differential pressure sensor 10, identified by dashed circle 2A in FIG. 2. FIG. 2 shows differential pressure sensor 10 and pedestal 40. Differential pressure sensor 10 includes topping wafer 20, diaphragm wafer 22, backing wafer 24, base wafer 26, diaphragm 28, first chamber 30, second chamber 32, first channel 34, and second channel 36. Pedestal 40 includes first passage 44 and second passage 46. Topping wafer 20 includes top side 70, bottom side 72, first cavity 74, groove 76, and cutouts 78. Diaphragm wafer 22 includes top side 80, bottom side 82, second cavity 84, chamfered walls 86, through hole 88, outer portion 90 (including chamfered portion 92 (shown in FIG. 2A) and rim portion 94 (shown in FIG. 2A)), and trench 96. Backing wafer 24 includes top side 100, bottom side 102, through hole 104, groove 105, and through hole 106. Base wafer 26 includes top side 110, bottom side 112, first cavity 114, first inlet 116, second cavity 118, second inlet 120, groove 122, and thin wall 124.

As discussed above with respect to FIG. 1, differential pressure sensor 10 is a MEMS device that is formed of a wafer stack including topping wafer 20, diaphragm wafer 22, backing wafer 24, and base wafer 26. Differential pressure sensor 10 includes diaphragm 28 that is part of diaphragm wafer 22. First chamber 30 is positioned above diaphragm 28 and is configured to receive a first fluid at a first pressure, and second chamber 32 is positioned below diaphragm 28 and is configured to receive a second fluid at a second pressure. First chamber 30 is fluidly coupled to first channel 34 that extends through topping wafer 20, diaphragm wafer 22, backing wafer 24, and base wafer 26. Second chamber 32 is fluidly coupled to second channel 36 that extends through backing wafer 24 and base wafer 26. Differential pressure sensor 10 is configured to be mounted on pedestal 40. Pedestal 40 is shown as having a cylindrical shape in FIG. 2, but can have any suitable shape in alternate embodiments.

Topping wafer 20 includes top side 70 and bottom side 72 opposite of top side 70. Topping wafer 20 forms a top layer of differential pressure sensor 10. Topping wafer 20 includes first cavity 74 formed on bottom side 72 of topping wafer 20. First cavity 74 defines part of first chamber 30 of differential pressure sensor 10. First cavity 74 is formed in topping wafer 20 using a KOH etching process in the embodiment shown in FIGS. 2-2A, but can be formed using any suitable process in alternate embodiments. Groove 76 is also formed in topping wafer 20 and forms a part of first channel 34 of differential pressure sensor 10. Groove 76 extends from first cavity 74 to bottom side 72 of topping wafer 20. Topping wafer 20 also includes cutouts 76 formed in the corners of topping wafer 20. Two corners of topping wafer 20 are shown in FIG. 2, but each of the four corners of topping wafer 20 will include one cutout 76.

Diaphragm wafer 22 includes top side 80 and bottom side 82 opposite of top side 80. Diaphragm wafer 22 forms a second layer of differential pressure sensor 10, and top side 80 of diaphragm wafer 22 is connected to bottom side 72 of topping wafer 20. Top side 80 of diaphragm wafer 22 defines a part of first chamber 30. Diaphragm wafer 22 includes second cavity 84 formed on bottom side 82 of diaphragm wafer 22. Second cavity 84 defines part of second chamber 32 of differential pressure sensor 10. Second cavity 84 is formed in diaphragm wafer 22 using a KOH etching process in the embodiment shown in FIGS. 2-2A, but can be formed using any suitable process in alternate embodiments. Second cavity 84 has chamfered walls 86 due to the KOH etching process that is used to form second cavity 84. Specifically, the KOH etching process gives chamfered walls 86 a 54.7° angle with respect to top side 80 of diaphragm wafer 22 when top side 80 of diaphragm wafer 22 has a (100) face. Through hole 88 is also formed in diaphragm wafer 22 and forms a part of first channel 34 of differential pressure sensor 10. Through hole 88 extends from top side 80 to bottom side 82 of diaphragm wafer 22 and is aligned with and fluidly coupled to groove 76 of topping wafer 20.

Diaphragm 28 forms a center portion of diaphragm wafer 22 and is positioned over second cavity 84. Diaphragm 28 is thinner than an overall thickness of diaphragm wafer 22 due to its placement over second cavity 84. Diaphragm wafer 22 further includes outer portion 90 that surrounds diaphragm 28. Outer portion 90 includes chamfered portion 92 and rim portion 94, as shown in FIG. 2A. Chamfered portion 92 is the section of outer portion 90 that is partially formed by chamfered walls 86. Rim portion 94 is a portion of outer portion 90 outwards of chamfered portion 92 that has a rectangular cross-section. Chamfered portion 92 extends between diaphragm 28 and rim portion 94.

As shown in FIG. 2A, trench 96 is a groove that is formed in outer portion 90 of diaphragm wafer 22. More specifically, trench 96 is formed in chamfered portion 92 of outer portion 90 of diaphragm wafer 22. Trench 96 has a rectangular cross-section and can have any suitable width or depth. Trench 96 is formed in diaphragm wafer 22 using a deep reactive-ion etching process in the embodiment shown in FIGS. 2-2A, which allows trench 96 to have a rectangular cross-section. Trench 96 can be formed in diaphragm wafer 22 using any suitable process in alternate embodiments. Trench 96 is positioned in outer portion 90 to protect diaphragm 28. Undesired stresses in differential pressure sensor 10, such as line pressure stresses and packaging stresses, can be absorbed in trench 96 and are prevented from reaching diaphragm 28. This prevents diaphragm 28 from erroneously deflecting due to undesired stresses in differential pressure sensor 10 and causing an erroneous differential pressure reading.

Backing wafer 24 includes top side 100 and bottom side 102 opposite of top side 100. Backing wafer 24 forms a third layer of differential pressure sensor 10, and top side 100 of backing wafer 24 is connected to bottom side 82 of diaphragm wafer 22. Top side 100 of backing wafer 24 defines a part of second chamber 32. Through hole 104 and groove 105 are also formed in backing wafer 24 and form a part of first channel 34 of differential pressure sensor 10. Through hole 104 extends from top side 100 to bottom side 102 of backing wafer 24 and is aligned with and fluidly coupled to through hole 88 of diaphragm wafer 22. Groove 105 extends from through hole 104 towards a center of backing wafer 24 and is fluidly coupled to through hole 104 of backing wafer 24. Through hole 106 is also formed in backing wafer 24 and forms a part of second channel 36 of differential pressure sensor 10. Through hole 106 extends from top side 100 to bottom side 102 of backing wafer 24 and is fluidly coupled to second cavity 84 of diaphragm wafer 22.

Base wafer 26 includes top side 110 and bottom side 112 opposite of top side 110. Base wafer 26 forms a bottom layer of differential pressure sensor 10, and top side 110 of base wafer 26 is connected to bottom side 102 of backing wafer 24. First cavity 114 and first inlet 116 are formed in base wafer 26 and form a part of first channel 34 of differential pressure sensor 10. First cavity 114 is positioned on top side 110 of base wafer 26 and is aligned with and fluidly coupled to groove 105 in backing wafer 24. First inlet 116 is aligned with and fluidly coupled to first cavity 114 and extends to bottom side 112 of base wafer 26. Second cavity 118 and second inlet 120 are formed in base wafer 26 and form a part of second channel 36 of differential pressure sensor 10. Second cavity 118 is positioned on top side 110 of base wafer 26 and is aligned with and fluidly coupled to through hole 106 in backing wafer 24. Second inlet 120 is aligned with and fluidly coupled to second cavity 118 and extends to bottom side 112 of base wafer 26.

Base wafer 26 also includes groove 122 formed on bottom side 112 of base wafer 26. Bottom side 112 of base wafer 26 is mounted on pedestal 40 and groove 122 is configured to receive a top portion of pedestal 40. Thin wall 124 is also formed in base wafer 26. Thin wall 124 is formed in part between first cavity 114 and groove 122 and in part between second cavity 118 and groove 122. In the embodiment shown in FIG. 2, pedestal 40 is made out of Kovar, while base wafer 26 (along with topping wafer 20, diaphragm wafer 22, and backing wafer 24) are made out of silicon. Kovar has a different thermal expansion coefficient than silicon. Thin wall 124 formed between groove 122 and first cavity 114 and between groove 122 and second cavity 118 is configured to absorb stress caused by thermal expansion and prevent that stress from being transferred into differential pressure sensor 10.

First channel 34 and second channel 36 are positioned in and extend through differential pressure sensor 10 so that pedestal 40 can be attached to the center of mass of differential pressure sensor 10. A first end of first channel 34 and a first end of second channel 36 are positioned adjacent to a center of base wafer 26. Specially, first cavity 114, first inlet 116, second cavity 118, and second inlet 120 extend through base wafer 26 adjacent to and on opposing sides of a center of differential pressure sensor 10. First cavity 114 and first inlet 116 of base wafer 26 fluidly connect to first passage 44 of pedestal 40 and to groove 106 of backing wafer 24, which fluidly connects to second chamber 32. Second First cavity 114 and first inlet 116 fluidly connect to first passage 44 of pedestal 40 and to groove 105 of backing wafer 24. Groove 105 extends laterally through backing wafer 24 to through hole 104 that is positioned laterally outward of second chamber 32, diaphragm 28, and first chamber 30. Through hole 104 is then fluidly connected to through hole 88 in diaphragm wafer 22, which is positioned laterally outward from second chamber 32, diaphragm 28, and first chamber 30. Through hole 88 is then fluidly connected to groove 76 in topping wafer 20. Groove 76 extends laterally inward from through hole 104, which is positioned laterally outward from second chamber 32, diaphragm 28, and first chamber 30, to fluidly connect to first chamber 30. Routing first channel 34 in this manner allows pedestal 40 to be connected to the center of mass of differential pressure sensor 10. Centering pedestal 40 on differential pressure sensor 10 allows for a smaller and more manageable differential pressure sensor and easier attachment, as it is less likely for differential pressure sensor 10 to tip when it is soldered onto pedestal 40.

Topping wafer 20, diaphragm wafer 22, backing wafer 24, and base wafer 26 are all made out of silicon in the embodiment shown in FIGS. 2-2A, thus having the same thermal expansion coefficient. In alternate embodiments, topping wafer 20, diaphragm wafer 22, backing wafer 24, and base wafer 26 can be made out of any suitable material. Preferably, all of topping wafer 20, diaphragm wafer 22, backing wafer 24, and base wafer 26 are made out of the same material so that the thermal expansion coefficient of each wafer is the same, which prevents thermal stresses between the wafers.

The package that differential pressure sensor 10 is held in and line pressure in differential pressure sensor 10 can cause stress in differential pressure sensor 10. Trench 96 is formed in outer portion 90, and specifically chamfered portion 92, to absorb stress in differential pressure sensor 10 and prevent that stress from being transmitted to diaphragm 28 and causing erroneous deflection of diaphragm 28. As a result of the inclusion of trench 96 in diaphragm wafer 22 of differential pressure sensor 10, topping wafer 20 and backing wafer 24 can be made thinner. As such, differential pressure sensor 10 can be made smaller and more manageable, allowing it to be used in a greater number of applications.

Figure 3:
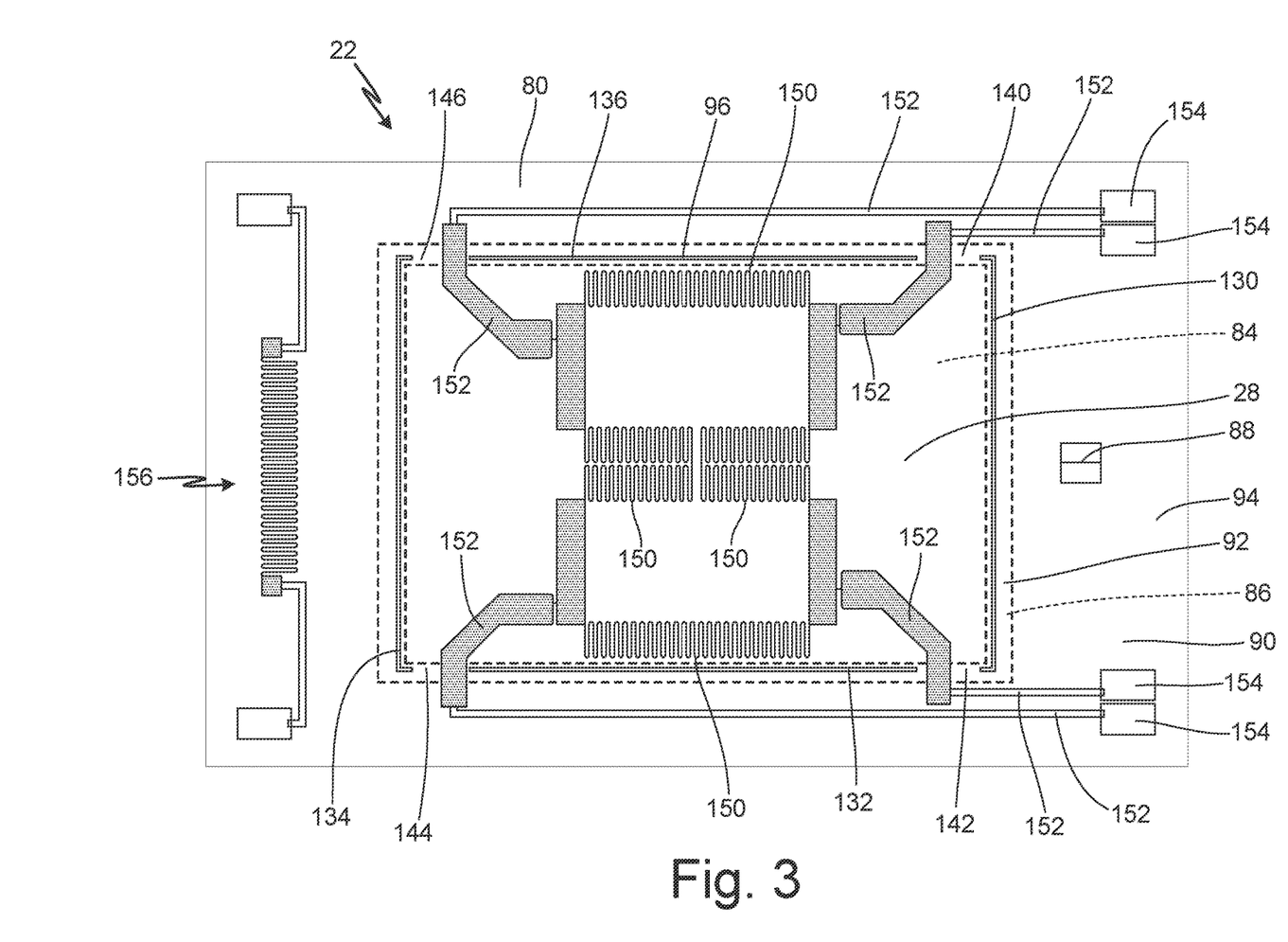
FIG. 3 is a top view of the diaphragm wafer of the differential pressure sensor with piezoresistors.

FIG. 3 is a top view of diaphragm wafer 22 of differential pressure sensor 10. Diaphragm wafer 22 includes diaphragm 28, top side 80, bottom side 82 (not shown in FIG. 3), second cavity 84, chamfered walls 86, through hole 88, outer portion 90 (including chamfered portion 92 and rim portion 94), and trench 96. Trench 96 includes first trench portion 130, second trench portion 132, third trench portion 134, and fourth trench portion 136. Diaphragm wafer 22 further includes first gap 140, second gap 142, third gap 144, and fourth gap 146. Differential pressure sensor 10 further includes piezoresistors 150, electrical traces 152, bond pads 154, and temperature sensing elements 156.

Diaphragm wafer 22 forms a center layer of differential pressure sensor 10 and includes diaphragm 28. Diaphragm wafer 22 has top side 80 and bottom side 82 opposite of top side 80. Diaphragm wafer 22 includes second cavity 84 having chamfered walls 86 formed on bottom side 82 of diaphragm wafer 22. Second cavity 84 defines part of second chamber 32 (shown in FIGS. 1-2) of differential pressure sensor 10. Through hole 88 extends from top side 80 to bottom side 82 of diaphragm wafer 22 and forms a part of first channel 34 (shown in FIGS. 1-2) of differential pressure sensor 10. Diaphragm 28 forms a center portion of diaphragm wafer 22 and is positioned over second cavity 84. Outer portion 90 surrounds diaphragm 28 and includes chamfered portion 92 and rim portion 94. Chamfered portion 92 is the section of outer portion 90 that is partially formed by chamfered walls 86. Rim portion 94 is a portion of outer portion 90 outwards of chamfered portion 92 that has a rectangular cross-section. Chamfered portion 92 extends between diaphragm 28 and rim portion 94.

As shown in FIG. 3, trench 96 is a groove that is formed in outer portion 90 of diaphragm wafer 22. More specifically, trench 96 is formed in chamfered portion 92 of outer portion 90 of diaphragm wafer 22. Trench 96 includes first trench portion 130 that is a u-shaped trench positioned on a first side of diaphragm 28, second trench portion 132 that is a straight trench positioned on a second side of diaphragm 28, third trench portion 134 that is a u-shaped trench positioned on a third side of diaphragm 28, and fourth trench portion 136 that is a straight trench positioned on a fourth side of diaphragm 28. First gap 140 is positioned between first trench portion 130 and fourth trench portion 136, second gap 142 is positioned between first trench portion 130 and second trench portion 132, third gap 144 is positioned between second trench portion 132 and third trench portion 134, and fourth gap 146 is positioned between third trench portion 134 and fourth trench portion 136.

Piezoresistors 150 are positioned on diaphragm 28 of diaphragm wafer 22. In the embodiment shown in FIG. 3, piezoresistors 150 are arranged in a Wheatstone bridge configuration on diaphragm 28. Electrical traces 152 extend from piezoresistors 150 to bond pads 154. Bond pads 154 are positioned in the corners of diaphragm wafer 22 on outer portion 90 of diaphragm wafer 22. Bond pads 154 are positioned in the corners of diaphragm wafer 22 to align with cutouts 78 of topping wafer 20 (shown in FIG. 2) so that bond pads 154 are accessible. Electrical traces 152 extend from diaphragm 28 to outer portion 90 of diaphragm wafer 22. First gap 140, second gap 142, third gap 144, and fourth gap 146 are positioned in trench 96 to provide pathways for electrical traces 152 to extend from piezoresistors 150 on diaphragm 28 to bond pads 154 on outer portion 90. Temperature sensing elements 156 are positioned on outer portion 90 of diaphragm wafer 22 and can include a resistor, electrical traces, and bond pads. Temperature sensing elements 156 are configured to sense a temperature of differential pressure sensor 10.

Figure 4:
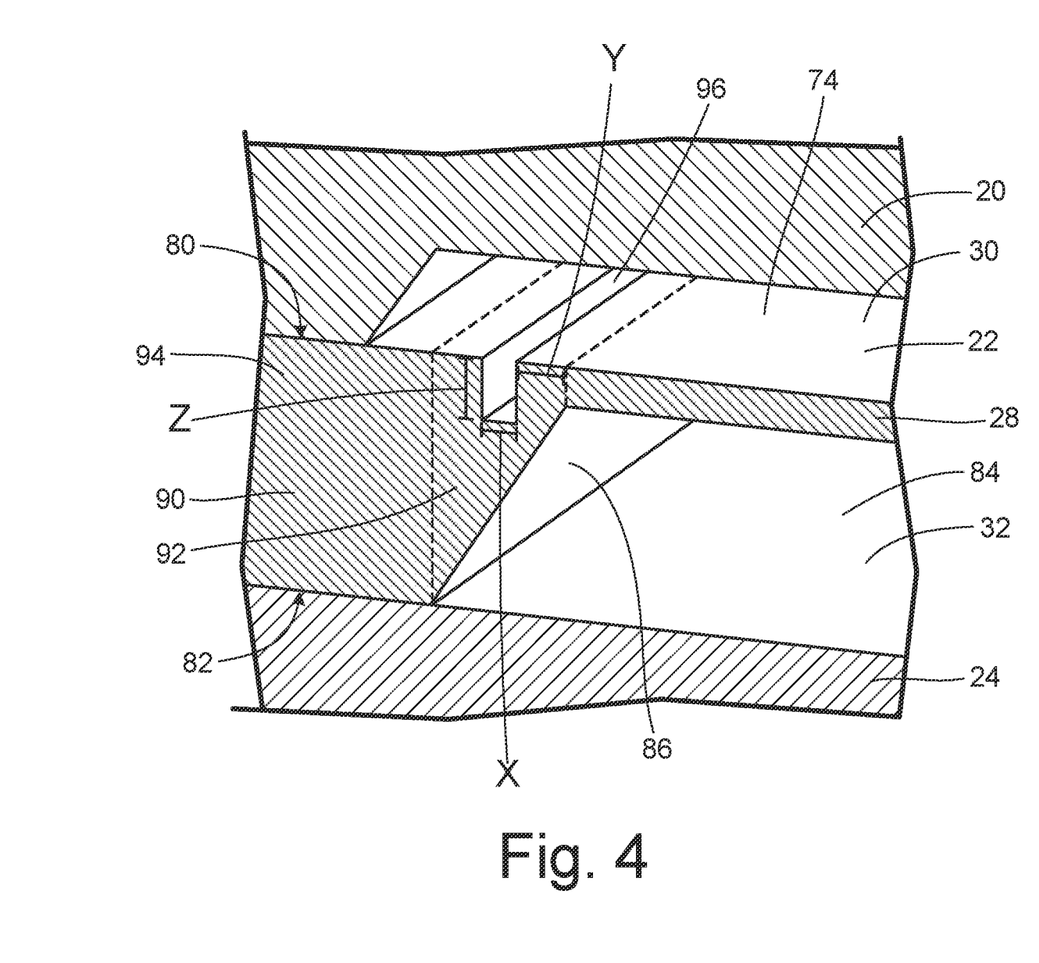
FIG. 4 is a cross-sectional perspective view of the trench in the diaphragm wafer of the differential pressure sensor.

FIG. 4 is a cross-sectional perspective view of trench 96 in diaphragm wafer 22 of differential pressure sensor 10. Differential pressure sensor 10 includes topping wafer 20, diaphragm wafer 22, backing wafer 24, diaphragm 28, first chamber 30, and second chamber 32. Topping wafer 20 includes first cavity 74. Diaphragm wafer 22 includes top side 80, bottom side 82, second cavity 84, chamfered walls 86, outer portion 90 (including chamfered portion 92 and rim portion 94), and trench 96. FIG. 4 also shows trench offset Y, trench width X, and trench depth Z.

Differential pressure sensor 10 has the structure and design as discussed above with respect to FIGS. 1-3. Trench 96 is positioned in outer portion 90 of diaphragm wafer 28 surrounding a perimeter of diaphragm 28. More specifically, trench 96 is positioned in chamfered portion 92 of outer portion 90 of diaphragm wafer 28. Trench 96 is positioned over chamfered walls 86 of diaphragm wafer 22 that form a perimeter of second cavity 84 in diaphragm wafer 22. Trench 96 is in fluid communication with first cavity 74 of topping wafer 20.

As shown in FIG. 4, trench 96 is offset from diaphragm 28 by trench offset Y. Trench 96 has a rectangular cross-section with trench width X and trench depth Z. Trench offset Y, trench width X, and trench depth Z can vary depending on the overall design of differential pressure sensor 10. All of trench offset Y, trench width X, and trench depth Z are selected to minimize the bending stress transferred to diaphragm 28. Specifically, trench offset Y and trench depth Z are selected to optimize a hinge point to null out the hinge moment.

Figure 5A:
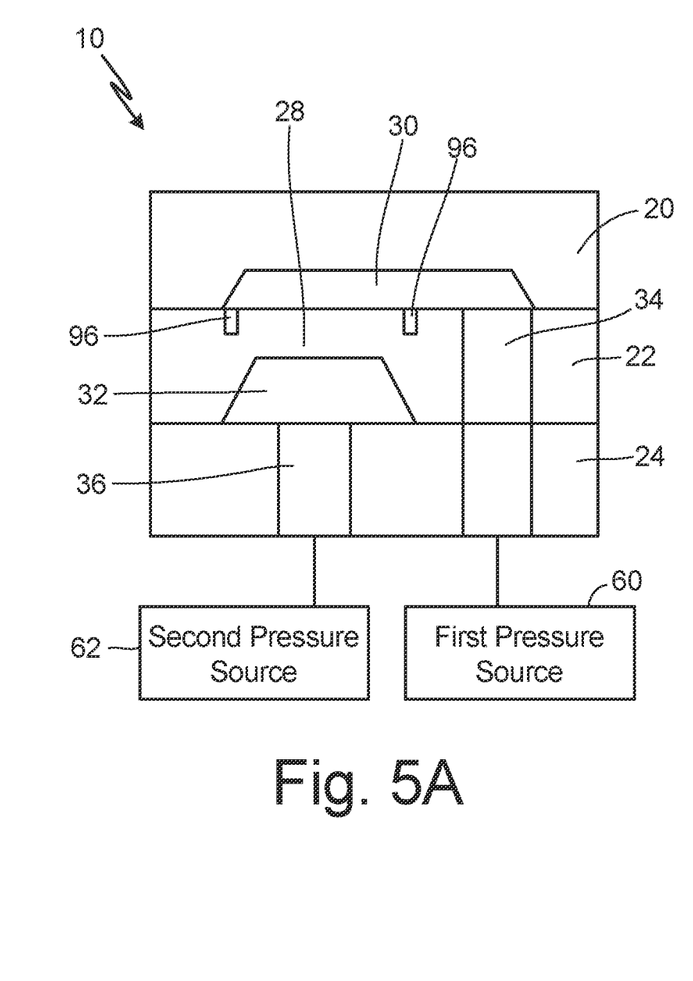
FIG. 5A is a schematic cross-sectional view of the differential pressure sensor with no pressure in a first chamber and a second chamber.
Figure 5B:
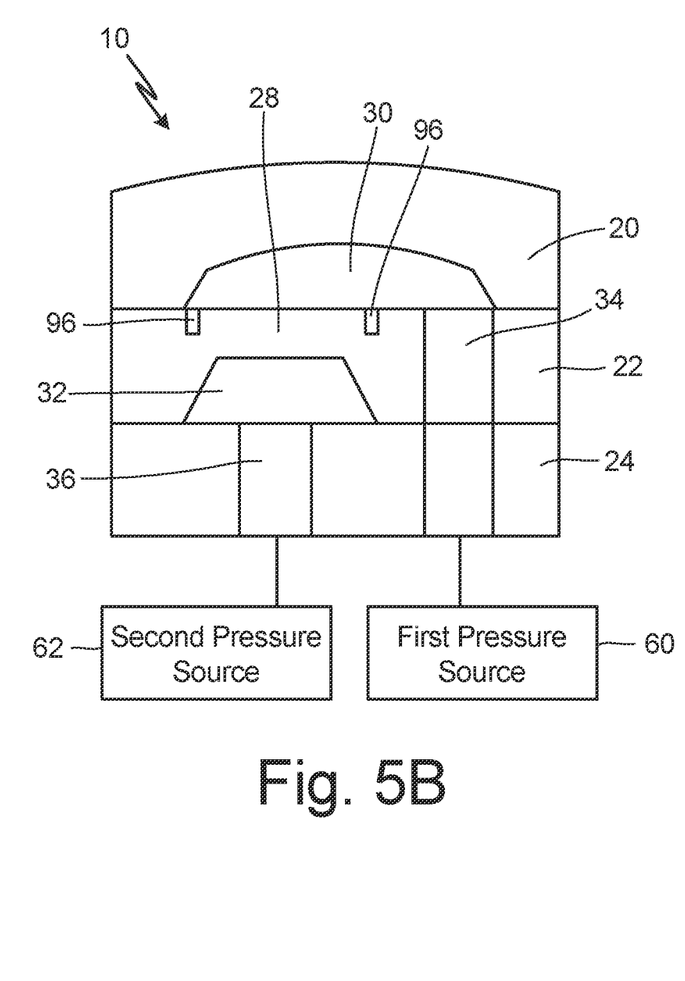
FIG. 5B is a schematic cross-sectional view of the differential pressure sensor with equal pressures in the first chamber and the second chamber.

FIG. 5A is a schematic cross-sectional view of differential pressure sensor 10 with no pressure in first chamber 30 and second chamber 32. FIG. 5B is a schematic cross-sectional view of differential pressure sensor 10 with equal pressures in first chamber 30 and second chamber 32. Differential pressure sensor 10 includes topping wafer 20, diaphragm wafer 22, backing wafer 24, diaphragm 28, first chamber 30, second chamber 32, first channel 34, and second chamber 36. Diaphragm wafer 22 also includes trench 96. FIGS. 5A-5B also show first fluid source 60 and second fluid source 62.

Differential pressure sensor 10 has the structure and design as discussed above with respect to FIGS. 1-4. As shown in FIG. 5A, when a first pressure of a first fluid in first chamber 30 and a second pressure of a second fluid in second chamber 32 are both 0 psi, there is no deflection in topping wafer 20 or diaphragm wafer 22. The differential pressure and the line pressure are both 0 psi.

As shown in FIG. 5B, when the first pressure of the first fluid in first chamber 30 and the second pressure of the second fluid in second chamber 32 are both 100 psi, there is deflection in topping wafer 20 but no deflection in diaphragm wafer 22 due to trench 96. In this case, the differential pressure is 0 psi but the line pressure is 100 psi and the stress from the line pressure causes topping wafer 20 to deform. In previous embodiments of differential pressure sensor 10 without trench 96, the line pressure would also cause diaphragm 28 to deform, causing an erroneous deflection of diaphragm 28 indicating an erroneous differential pressure between the first fluid and the second fluid. In the present embodiment of differential pressure sensor 10, trench 96 absorbs the stresses placed on differential pressure sensor 10 due to the line pressure in differential pressure sensor 10. Further, any mechanical stresses placed on differential pressure sensor 10 due to the package in which differential pressure sensor 10 is positioned in can be absorbed thin wall 124 of base wafer 26 (shown in FIG. 2) and by trench 96. As a result, diaphragm 28 does not deflect and does not cause an erroneous differential pressure reading.

Discussion of Possible Embodiments

The following are non-exclusive descriptions of possible embodiments of the present invention.

A differential MEMS pressure sensor includes a topping wafer with a top side and a bottom side, a diaphragm wafer having a top side connected to the bottom side of the topping wafer and a bottom side, and a backing wafer having a top side connected to the bottom side of the diaphragm wafer and a bottom side. The topping wafer includes a first cavity formed in the bottom side of the topping wafer. The diaphragm wafer includes a diaphragm, a second cavity formed in the bottom side of the diaphragm wafer underneath the diaphragm, an outer portion surrounding the diaphragm, and a trench formed in the top side of the diaphragm wafer and positioned in the outer portion surrounding the diaphragm.

The sensor of the preceding paragraph can optionally include, additionally and/or alternatively, any one or more of the following features, configurations and/or additional components:

Wherein the second cavity formed in the bottom side of the diaphragm wafer has chamfered walls, and wherein the outer portion of the diaphragm wafer has a chamfered portion partially defined by the chamfered walls of the second cavity and a rim portion surrounding the chamfered portion.

Wherein the trench is positioned in the chamfered portion of the outer portion of the diaphragm wafer.

Wherein the trench has a first trench portion, a second trench portion, and a first gap positioned between the first trench portion and the second trench portion.

The sensor further includes a piezoresistor on the diaphragm of the diaphragm wafer, a bond pad positioned on the outer portion of the diaphragm wafer outward of the trench, and an electrical trace extending from the piezoresistor on the diaphragm through the first gap in the trench to the bond pad on the outer portion.

Wherein the topping wafer, the diaphragm wafer, and the backing wafer are silicon.

Wherein the trench is formed in the diaphragm wafer using a deep reactive-ion etching process.

Wherein the trench is offset from the diaphragm by a trench offset Y, the trench has a trench width X, the trench has a trench depth Z, wherein the trench offset Y, the trench width X, and the trench depth Z are configured to minimize a bending stress transferred to the diaphragm, and wherein the trench offset Y and the trench depth Z are configured to null out a hinge moment.

Wherein the trench in the diaphragm wafer is in fluid communication with the first cavity in the topping wafer.

The sensor further includes a base wafer having a top side connected to a bottom side of the backing wafer and a bottom side.

The sensor further includes a first channel extending through the base wafer, the backing wafer, the diaphragm wafer, and the topping wafer and fluidly connected to the first cavity, and a second channel extending through the base wafer and the backing wafer and fluidly connected to the second cavity, wherein a first end of the first channel and a first end of the second channel are positioned adjacent to a center of the base wafer, and wherein the first channel extends laterally outward of the first cavity, the diaphragm, and the second cavity in the backing wafer.

Where the base wafer further includes a third cavity formed in the top side of the base wafer, a fourth cavity formed in the top side of the base wafer, a groove formed in the bottom side of the base wafer, and a thin wall having a first portion between the third cavity and the groove and a second portion between the fourth cavity and the groove, wherein the groove is configured to receive a portion of a pedestal on which the sensor is mounted.

A system includes a differential MEMS pressure sensor and a pedestal on which the differential MEMS pressure sensor is mounted. The differential MEMS pressure sensor includes a topping wafer with a top side and a bottom side, a diaphragm wafer having a top side connected to the bottom side of the topping wafer and a bottom side, a backing wafer having a top side connected to the bottom side of the diaphragm wafer and a bottom side, and a base wafer having a top side connected to the bottom side of the backing wafer and a bottom side. The topping wafer includes a first cavity formed in the bottom side of the topping wafer. The diaphragm wafer includes a diaphragm, a second cavity formed in the bottom side of the diaphragm wafer underneath the diaphragm, and an outer portion surrounding the diaphragm. The base wafer includes a third cavity formed in the top side of the base wafer, a groove formed in the bottom side of the base wafer, and a thin wall formed between the third cavity and the groove. The groove is configured to receive a portion of the pedestal.

The system of the preceding paragraph can optionally include, additionally and/or alternatively, any one or more of the following features, configurations and/or additional components:

Wherein the diaphragm wafer further includes a trench formed in the top side of the diaphragm wafer and positioned in the outer portion surrounding the diaphragm.

Wherein the second cavity formed in the bottom side of the diaphragm wafer has chamfered walls, wherein the outer portion of the diaphragm wafer has a chamfered portion partially defined by the chamfered walls of the second cavity and a rim portion surrounding the chamfered portion, and wherein the trench is positioned in the chamfered portion of the outer portion of the diaphragm wafer.

Wherein the topping wafer, the diaphragm wafer, the backing wafer, and the base wafer are made out of silicon, and wherein the trench is formed in the diaphragm wafer using a deep reactive-ion etching process.

Wherein the trench has a first trench portion, a second trench portion, and a first gap positioned between the first trench portion and the second trench portion, and wherein the differential pressure sensor further includes a piezoresistor on the diaphragm of the diaphragm wafer, a bond pad positioned on the outer portion of the diaphragm wafer outward of the trench, and an electrical trace extending from the piezoresistor on the diaphragm through the first gap in the trench to the bond pad on the outer portion.

The system further includes a first channel extending through the base wafer, the backing wafer, the diaphragm wafer, and the topping wafer and fluidly connected to the first cavity, and a second channel extending through the base wafer and the backing wafer and fluidly connected to the second cavity, wherein a first end of the first channel and a first end of the second channel are positioned adjacent to a center of the base wafer, and wherein the first channel extends laterally outward of the first cavity, the diaphragm, and the second cavity in the backing wafer.

The system further includes a header positioned outward of and connected to the pedestal, and a cap positioned around the differential MEMS pressure sensor and sealed against the header.

The system further includes a fourth cavity formed in the top side of the base wafer, wherein the thin wall has a first portion between the third cavity and the groove and a second portion between the fourth cavity and the groove.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A differential MEMS pressure sensor comprising:
a topping wafer with a top side, a bottom side, and a first cavity formed in the bottom side of the topping wafer;
a diaphragm wafer having a top side connected to the bottom side of the topping wafer and a bottom side, wherein the diaphragm wafer comprises:
a diaphragm;
a second cavity formed in the bottom side of the diaphragm wafer underneath the diaphragm, wherein the second cavity has chamfered walls;
an outer portion surrounding the diaphragm, wherein the outer portion has a chamfered portion partially defined by the chamfered walls of the second cavity and a rim portion surrounding the chamfered portion; and
a trench formed in the top side of the diaphragm wafer and positioned in the outer portion surrounding the diaphragm, wherein the trench is positioned in the chamfered portion of the outer portion of the diaphragm wafer; and
a backing wafer having a top side connected to the bottom side of the diaphragm wafer and a bottom side.

2. The sensor of claim 1, wherein the trench has a first trench portion, a second trench portion, and a first gap positioned between the first trench portion and the second trench portion.

3. The sensor of claim 2, and further comprising:
a piezoresistor on the diaphragm of the diaphragm wafer;
a bond pad positioned on the outer portion of the diaphragm wafer outward of the trench; and
an electrical trace extending from the piezoresistor on the diaphragm through the first gap in the trench to the bond pad on the outer portion.

4. The sensor of claim 1, wherein the topping wafer, the diaphragm wafer, and the backing wafer are silicon.

5. The sensor of claim 4, wherein the trench is formed in the diaphragm wafer using a deep reactive-ion etching process.

6. The sensor of claim 1, wherein the trench in the diaphragm wafer is in fluid communication with the first cavity in the topping wafer.

7. The sensor of claim 1, and further comprising:
a base wafer having a top side connected to a bottom side of the backing wafer and a bottom side.

8. The sensor of claim 7, and further comprising:
a first channel extending through the base wafer, the backing wafer, the diaphragm wafer, and the topping wafer and fluidly connected to the first cavity; and
a second channel extending through the base wafer and the backing wafer and fluidly connected to the second cavity;
wherein a first end of the first channel and a first end of the second channel are positioned adjacent to a center of the base wafer; and
wherein the first channel extends laterally outward of the first cavity, the diaphragm, and the second cavity in the backing wafer.

9. The sensor of claim 7, wherein the base wafer further comprises:
a third cavity formed in the top side of the base wafer;
a fourth cavity formed in the top side of the base wafer;
a groove formed in the bottom side of the base wafer; and a thin wall having a first portion between the third cavity and the groove and a second portion between the fourth cavity and the groove;

wherein the groove is configured to receive a portion of a pedestal on which the sensor is mounted.

10. A system comprising:

a differential MEMS pressure sensor comprising:
- a topping wafer with a top side, a bottom side, and a first cavity formed in the bottom side of the topping wafer;
- a diaphragm wafer having a top side connected to the bottom side of the topping wafer and a bottom side, wherein the diaphragm wafer comprises:
  - a diaphragm;
  - a second cavity formed in the bottom side of the diaphragm wafer underneath the diaphragm; and
  - an outer portion surrounding the diaphragm;
- a backing wafer having a top side connected to the bottom side of the diaphragm wafer and a bottom side; and
- a base wafer having a top side connected to the bottom side of the backing wafer and a bottom side, wherein the base wafer comprises:
  - a third cavity formed in the top side of the base wafer;
  - a groove formed in the bottom side of the base wafer; and
  - a thin wall formed between the third cavity and the groove; and a pedestal on which the differential MEMS pressure sensor is mounted;

wherein the groove in the base wafer is configured to receive a portion of the pedestal.

11. The system of claim 10, wherein the diaphragm wafer further comprises:
a trench formed in the top side of the diaphragm wafer and positioned in the outer portion surrounding the diaphragm.

12. The system of claim 11, wherein the second cavity formed in the bottom side of the diaphragm wafer has chamfered walls, wherein the outer portion of the diaphragm wafer has a chamfered portion partially defined by the chamfered walls of the second cavity and a rim portion surrounding the chamfered portion, and wherein the trench is positioned in the chamfered portion of the outer portion of the diaphragm wafer.

13. The system of claim 11, wherein the topping wafer, the diaphragm wafer, the backing wafer, and the base wafer are made out of silicon, and wherein the trench is formed in the diaphragm wafer using a deep reactive-ion etching process.

14. The system of claim 11, wherein the trench has a first trench portion, a second trench portion, and a first gap positioned between the first trench portion and the second trench portion, and wherein the differential pressure sensor further comprises:
- a piezoresistor on the diaphragm of the diaphragm wafer;
- a bond pad positioned on the outer portion of the diaphragm wafer outward of the trench; and
- an electrical trace extending from the piezoresistor on the diaphragm through the first gap in the trench to the bond pad on the outer portion.

15. The system of claim 10, and further comprising:
- a first channel extending through the base wafer, the backing wafer, the diaphragm wafer, and the topping wafer and fluidly connected to the first cavity; and
- a second channel extending through the base wafer and the backing wafer and fluidly connected to the second cavity;

wherein a first end of the first channel and a first end of the second channel are positioned adjacent to a center of the base wafer; and wherein the first channel extends laterally outward of the first cavity, the diaphragm, and the second cavity in the backing wafer.

16. The system of claim 10, and further comprising:
- a header positioned outward of and connected to the pedestal; and
- a cap positioned around the differential MEMS pressure sensor and sealed against the header.

17. The system of claim 10, and further comprising:
a fourth cavity formed in the top side of the base wafer;

wherein the thin wall has a first portion between the third cavity and the groove and a second portion between the fourth cavity and the groove.

* * * * *